United States Patent [19]

Kuwahara et al.

[11] Patent Number: 5,784,499
[45] Date of Patent: Jul. 21, 1998

[54] METHOD FOR REDUCING NOISE IN IMAGE SIGNALS AND APPARATUS THEREFOR

[75] Inventors: Yasuhiro Kuwahara, Osaka; Haruo Yamashita, Ibaraki; Tsumoru Fukushima, Kyoto, all of Japan

[73] Assignee: Matsushita Electric Industrial Co., Ltd., Osaka, Japan

[21] Appl. No.: 877,727

[22] Filed: Jun. 18, 1997

Related U.S. Application Data

[63] Continuation of Ser. No. 424,620, Apr. 19, 1995, abandoned.

[30] Foreign Application Priority Data

Apr. 19, 1994  [JP]  Japan .......................... 6-080737

[51] Int. Cl.⁶ .......................................... G06K 9/40
[52] U.S. Cl. ................................. 382/264; 382/262
[58] Field of Search ........................... 382/275, 264, 382/269, 205, 262, 274; 345/136; 358/447

[56] References Cited

U.S. PATENT DOCUMENTS

| | | | |
|---|---|---|---|
| 4,561,022 | 12/1985 | Bayer | 382/275 |
| 4,761,819 | 8/1988 | Denison et al. | 382/128 |
| 4,853,970 | 8/1989 | Ott et al. | 382/266 |
| 4,887,306 | 12/1989 | Hwang et al. | 382/264 |
| 4,941,190 | 7/1990 | Joyce | 382/264 |
| 5,036,405 | 7/1991 | Kojima | 358/448 |
| 5,065,436 | 11/1991 | Matsumura | 382/275 |
| 5,140,432 | 8/1992 | Chan | 358/298 |
| 5,442,462 | 8/1995 | Guissin | 358/463 |
| 5,506,699 | 4/1996 | Wong | 382/264 |

FOREIGN PATENT DOCUMENTS

| | | |
|---|---|---|
| 4-184576 | 7/1992 | Japan . |
| 5-205055 | 8/1993 | Japan . |

*Primary Examiner*—Yon Couso
*Attorney, Agent, or Firm*—McDermott, Will & Emery

[57] ABSTRACT

In an image data including tone information, a level of an attentional picture element in an image and a level of an adjacent picture element located adjacent to the attentional picture element are smoothed to create a first substitution level, and by internally dividing the level of the attentional picture element and the first substitution level with a predetermined internal division ratio to obtain a second substitution level which finally substitutes the level of the attentional picture element.

9 Claims, 15 Drawing Sheets

FIG. 14 (Prior art)

|  0  | 1/5 |  0  |
|-----|-----|-----|
| 1/5 | 1/5 | 1/5 |
|  0  | 1/5 |  0  |

FIG. 15 (Prior art)

| 1/10 | 1/10 | 1/10 |
|------|------|------|
| 1/10 | 2/10 | 1/10 |
| 1/10 | 1/10 | 1/10 |

FIG. 16

| 67 | 63 | 62 | 66 | 68 |
|----|----|----|----|----|
| 63 | 60 | 59 | 65 | 62 |
| 63 | 60 | 61 | 60 | 59 |
| 65 | 63 | 62 | 60 | 64 |
| 64 | 60 | 66 | 64 | 60 |

FIG. 17 (Prior art)

|  |  |  |  |  |
|---|---|---|---|---|
|  | 61 | 61 | 62 |  |
|  | 61 | 60 | 61 |  |
|  | 62 | 61 | 62 |  |
|  |  |  |  |  |

FIG. 18

| 43 | 42 | 45 | 44 | 46 |
|----|----|----|----|----|
| 47 | 43 | 42 | 46 | 48 |
| 83 | 80 | 79 | 85 | 82 |
| 123 | 120 | 121 | 120 | 119 |
| 127 | 125 | 120 | 126 | 120 |

FIG. 19 (Prior art)

|  |  |  |  |  |
|---|---|---|---|---|
|  | 43 | 44 | 45 |  |
|  | 43 | 43 | 46 |  |
|  | 80 | 80 | 82 |  |
|  | 121 | 120 | 120 |  |
|  | 125 | 125 | 120 |  |

FIG. 20

| 47 | 43 | 42 | 46 | 48 |
|----|----|----|----|-----|
| 83 | 80 | 79 | 85 | 82 |
| 123| 120| 121| 120| 119 |
| 105| 103| 102| 100| 104 |
| 84 | 80 | 86 | 84 | 80 |

FIG. 21 (Prior art)

|   |   |   |   |   |
|---|---|---|---|---|
|   | 81 | 81 | 82 |   |
|   | 109| 108| 109|   |
|   | 102| 102| 102|   |
|   |   |   |   |   |

FIG. 22

| 43 | 62 | 121 | 67 | 42 |
|---|---|---|---|---|
| 60 | 84 | 125 | 82 | 62 |
| 120 | 122 | 123 | 120 | 119 |
| 62 | 84 | 120 | 83 | 65 |
| 46 | 63 | 122 | 66 | 44 |

FIG. 23 (Prior art)

|  | 62 | 67 | 67 |  |
|---|---|---|---|---|
|  | 84 | 84 | 82 |  |
|  | 122 | 122 | 120 |  |
|  | 84 | 84 | 83 |  |
|  | 63 | 66 | 66 |  |

FIG. 24

|  |  |  |  |  |
|---|---|---|---|---|
| 54 | 80 | 123 | 76 | 57 |
| 120 | 122 | 124 | 120 | 119 |
| 62 | 84 | 122 | 83 | 65 |
| 52 | 68 | 121 | 72 | 49 |

FIG. 25 (Prior art)

| 1/2 |
|---|
| 1/2 |

FIG. 26

| 35 | 32 | 34 | 33 | 36 |
|----|----|----|----|----|
| 52 | 50 | 58 | 56 | 53 |
| 74 | 73 | 72 | 73 | 77 |
| 90 | 92 | 94 | 91 | 93 |
| 112 | 113 | 115 | 110 | 111 |

FIG. 27 (Prior art)

|  |  |  |  |  |
|----|----|----|----|----|
| 44 | 41 | 58 | 56 | 45 |
| 74 | 73 | 65 | 65 | 77 |
| 82 | 83 | 94 | 82 | 85 |
| 112 | 113 | 115 | 101 | 102 |

FIG. 28

|  |  |  |  |  |
|----|----|----|----|----|
| 46 | 45 | 54 | 52 | 47 |
| 70 | 69 | 66 | 67 | 73 |
| 84 | 87 | 90 | 86 | 87 |
| 108 | 108 | 110 | 105 | 106 |

METHOD FOR REDUCING NOISE IN IMAGE SIGNALS AND APPARATUS THEREFOR

This is a continuation of application Ser. No. 08/424,620 filed Apr. 19, 1995, now abandoned.

FIELD OF THE INVENTION AND RELATED ART STATEMENT

1. Field of the Invention

The present invention relates to an image signal processing method and an apparatus therefor each for reducing noise in image signals of visual apparatuses and information processing apparatuses such as TV, VTR, printer and copying machine in which tone image is handled.

2. Description of the Related Art

In recent years, with the development of hard copy technology especially of color, it has become possible to reproduce high-fidelity picture by a present printing technique such as sublimation thermal transfer process. In this sublimation thermal transfer process, color reproducibility equivalent to the photography is obtained by a specific recording medium and through a specific image processing. Also, resolution almost equivalent to the photography is obtained by using high definition image signals.

However, in a video printer for recording TV signals produced in accordance with the existing method, a resolution is restricted due to the bandwidth compression of image signals in the NTSC. It is therefore impossible to obtain a satisfactory resolution as compared with a resolution of a printer. Besides, noises always get mixed in an image when image signals are input to the video printer. In particular, when image signals under the NTSC etc. is supplied to a printer of sublimation thermal transfer type, picture quality remarkably deteriorates due to existence of the white noise and the light-and-shade noise (i.e., density difference between an even number field and an odd number field).

To reduce the above-mentioned noises, a method utilizing a smoothing filter having a matrix of 3 (row)×3 (column) as shown in FIG. 14 and FIG. 15 has been known conventionally in technology of image processing for a still picture. Calculation for each picture element is executed by utilizing the smoothing filter shown in FIG. 14 and FIG. 15, thereby reducing noises.

For example, when the smoothing filter shown in FIG. 14 acts on an image shown in FIG. 16, respective one fifth (⅕) values of an attentional picture element (i.e., a central picture element) and adjacent picture elements in up, down, left and right directions are added with each other to obtain their sum value, and a value of the attentional picture element is replaced by the sum value. This is the smoothing step for one attentional picture element, and the smoothing step is sequentially applied to respective picture elements shown in FIG. 16.

As a result, an image shown in FIG. 17 is obtained. In FIG. 16 and FIG. 17, respective picture elements in image data are normalized into values ranging from 0 (the minimum level) to 255 (the maximum level), which is similarly applied to the following description unless note is given to the contrary.

As another conventional image processing method, a method using the median filter is known. According to this median filter, a medium level value of a local area is defined as an output level. For example, when an 1×3 median filter sequentially acts on an image shown in FIG. 18, a resultant image shown in FIG. 19 is obtained. In this method, a medium value among three picture elements adjacently aligned (i.e., a medium level value of three values of level) is defined as a value of the central (i.e., attentional) picture element. For example, please pay attention to values 43, 42 and 45 of three picture elements aligned from the left side in the top row of the image shown in FIG. 18. The attentional picture element is the central picture element of value 42. A medium value of the three picture elements is 43. Therefore, the original value 42 of the central picture element is replaced by the medium value 43.

However, in the above-mentioned conventional methods, it is difficult to reduce noise without blurring edges and thin lines of the image.

For example, when the noise is reduced by the smoothing filter shown in FIG. 14, an image shown in FIG. 20 is changed into an image shown in FIG. 21. As is apparent from FIG. 20 and FIG. 21, the image shown in FIG. 21 gets blurred as compared with the image shown in FIG. 20. In other words, amplitudes of the edges in FIG. 21 are made smaller than amplitudes of the edges in FIG. 20. This means that quality of image has deteriorated. For example, please pay attention to values 80, 120 and 103 in the secondary column from the left end at the second to fourth picture element in this column in FIG. 20. When the smoothing filter now acts on the image shown in FIG. 20, the above-mentioned values 80, 120 and 103 are changed into 81, 109 and 102, respectively, as shown in FIG. 21. As a result of this change of values, level variation is made undesirably gentle. Thereby, the image has been blurred.

According to another method for eliminating the blurring of image, weight of the center of a filter matrix applied to the image is made larger than peripheral weights as shown in FIG. 15 to thereby smooth the image. However, even when this method is used, it is impossible to sufficiently eliminate the blurring of image.

By utilizing the median filter, it is possible to more efficiently prevent blurring of the edges as compared with the smoothing filter shown in FIG. 14 and FIG. 15. However, in case there is thin lines (e.g., cross-shaped lines having values of approximately 120) in the image as shown in FIG. 22, application of the median filter to the image may result in an unexpected image shown in FIG. 23. As is apparent from FIG. 23, the vertical (longitudinal) thin line (121, 125, 123, 120, 122), which existed in FIG. 22, has vanished away now. Also, even when the sidewise median filter such as 3×1 is used, the thin line (120, 122, 123, 120, 119) in the horizontal (transverse) direction vanishes in the similar phenomenon (not shown) to the vertical thin line.

In the NTSC type TV etc., a horizontal resolution of the image signals is generally lower than a vertical resolution of the image signals. Therefore, quality of image extremely deteriorates when the filtering is executed in the horizontal direction. However, even when the filtering is executed with the median filter in the vertical direction, the thin line vanishes too.

As another method, it would have been possible to change the condition whether the filtering process is applied to the image or not. That is, in this method a level difference of brightness in the vertical direction is compared with a simple threshold value. When the level difference exceeds the threshold value, the filtering process is not executed. When the level difference does not exceed the threshold value, the filter effective in the vertical direction as shown in FIG. 25 is applied to the image. However, pre-setting of the threshold value is difficult. For example, when the threshold value is selected to have the level difference of 20, an image shown in FIG. 26 is changed into an image shown in FIG. 27. In FIG. 27, level differences between adjacent two picture elements are made larger than corresponding level differences in the original image shown in FIG. 26. The edges are thereby sharpened, and a pseudo contour may appear. In other words, continuity of image is spoiled, thereby causing unnatural variation of values.

OBJECT AND SUMMARY OF THE INVENTION

An object of the present invention is to offer a method for reducing noise in image signals and an apparatus therefor in which noise is reduced without any blurring of the image and losing of thin lines and without any appearance of pseudo contour.

In order to achieve the above-mentioned object, a method for reducing noise in image signals in the present invention comprises the steps of:

smoothing a level of an attentional picture element in an image and a level of an adjacent picture element located adjacent to the attentional picture element to create a first substitution level;

determining an internal division ratio by referring to the level of the attentional picture element and the level of the adjacent picture element;

creating a second substitution level by internally dividing the level of the attentional picture element and the first substitution level with the internal division ratio; and replacing the level of the attentional picture element by the second substitution level.

According to the above-mentioned method, continuity of image is maintained. Thereby, no pseudo contour appears, and noise can be reduced with edges of image and thin lines kept as they were before execution of the noise reduction.

Also, another method of the present invention comprises the steps of:

smoothing in plural directions a level of an attentional picture element in an image and each of levels of adjacent picture elements located adjacent to the attentional picture element in the plural directions to create first substitution levels respectively in the plural directions;

determining internal division ratios respectively in the plural directions by referring to the level of the attentional picture element and each of the levels of the adjacent picture elements;

creating second substitution levels respectively in the plural directions by internally dividing the level of the attentional picture element and each of the first substitution levels;

composing the second substitution levels together to obtain a composite substitution level; and replacing the level of the attentional picture element by the composite substitution level.

According to the above-mentioned method, since noise reduction is carried out by taking many factors in multidirections into consideration, well-balanced noise reduction can be realized.

In another aspect, an apparatus for reducing noise in image signals in the present invention comprises:

smoothing means for smoothing a level of an attentional picture element in an image and a level of an adjacent picture element located adjacent to the attentional picture element to create a first substitution level; and signal correction means for replacing the level of the attentional picture element by a second substitution level, the signal correction means creating the second substitution level which corresponds to a level for internally dividing the level of the attentional picture element and the first substitution level with an internal division ratio derived from correlation between the level of the attentional picture element and the level of the adjacent picture element.

According to the above-mentioned method, continuity of image is maintained. Thereby, no pseudo contour appears, and noise can be reduced with edges of image and thin lines kept as they were before execution of the noise reduction.

Also, an apparatus of the present invention comprises:

smoothing means for smoothing in plural directions a level of an attentional picture element in an image and levels of adjacent picture elements located adjacent to the attentional picture element in the plural directions to create first substitution levels respectively in the plural directions;

signal correction means for respectively correcting the first substitution levels into second substitution levels with respect to the plural directions, each of said second substitution levels corresponding to a level for internally dividing the level of the attentional picture element and each of the first substitution levels with an internal division ratio derived from correlation between the level of the attentional picture element and each of the levels of the adjacent picture elements; and substitution-signal composing means for composing the second substitution levels together to obtain a composite substitution level for replacing therewith the level of the attentional picture element.

According to the above-mentioned apparatus, since noise reduction is carried out by taking many factors in multidirections into consideration, well-balanced noise reduction can be realized.

Further, by composing the second substitution levels together with respective weights given thereto to obtain the composite substitution level, it is possible to especially reduce noise in a specific direction. For instance, light-and-shade noise caused between fields is easily reduced by especially enhancing weights in the vertical direction.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 14 is an illustration showing the conventional smoothing filter;

FIG. 15 is an illustration showing the conventional smoothing filter;

FIG. 16 is an illustration showing a state of image before execution of a noise reduction procedure by the smoothing filter;

FIG. 17 is an illustration showing a state of image after execution of the noise reduction procedure by the smoothing filter;

FIG. 18 is an illustration showing a state of image before execution of a noise reduction procedure by a median filter;

FIG. 19 is an illustration showing a state of image after execution of the noise reduction procedure by the median filter;

FIG. 20 is an illustration showing a state of image before execution of a noise reduction procedure by the smoothing filter;

FIG. 21 is an illustration showing a state of image after execution of the noise reduction procedure by the smoothing filter;

FIG. 22 is an illustration showing an image including thin lines;

FIG. 23 is an illustration showing a state of image after execution of the noise reduction procedure by the median filter onto the image shown in FIG. 22;

FIG. 24 is an illustration showing a state of image after execution of a noise reduction procedure of the present invention onto the image shown in FIG. 22;

FIG. 25 is an illustration showing a smoothing filter effective in the vertical direction;

FIG. 26 is an illustration showing an image having an edge;

FIG. 27 is an illustration showing a state of image after execution of a noise reduction procedure onto the image shown in FIG. 26 by the filter shown in FIG. 25 by referring to a threshold value; and FIG. 28 is an illustration showing a state of image after execution of a noise reduction procedure of the present invention onto the image shown in FIG. 26.

DESCRIPTION OF THE PREFERRED EMBODIMENTS

Hereafter, preferred embodiments will be described with reference to the accompanying drawings.

FIRST EMBODIMENT OF METHOD

Figure 1:
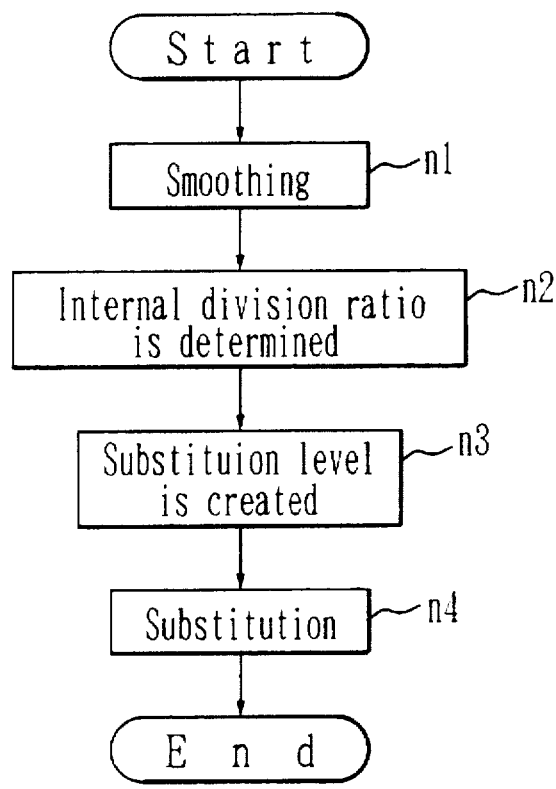
FIG. 1 is a flow chart showing a first method for reducing noise in image signals in the present invention.

FIG. 1 is a flow chart showing a method for reducing noise in image signals. In this method, noise is reduced by replacing a level of an attentional picture element of image with a substitution level which is obtained by referring to the attentional picture element and an adjacent picture element thereto. The term of "level" means a variety of levels of signals for constituting an image, and it is typically a level of luminance signal. In a step n1, a level of the attentional picture element and a level of the picture element adjacent to the attentional picture element in the upward or downward directions are subjected to a smoothing process to create a first substitution level. In a step n2, an internal division ratio is determined from correlation of the level of the attentional picture element and the level of the adjacent picture element. In a step n3, the level of the attentional picture element and the first substitution level are internally divided with the internal division ratio to create a second substitution level. In a step n4, the level of the attentional picture element is replaced by the second substitution level. Hereafter, the above-mentioned respective steps will be described in detail.

Figure 2:
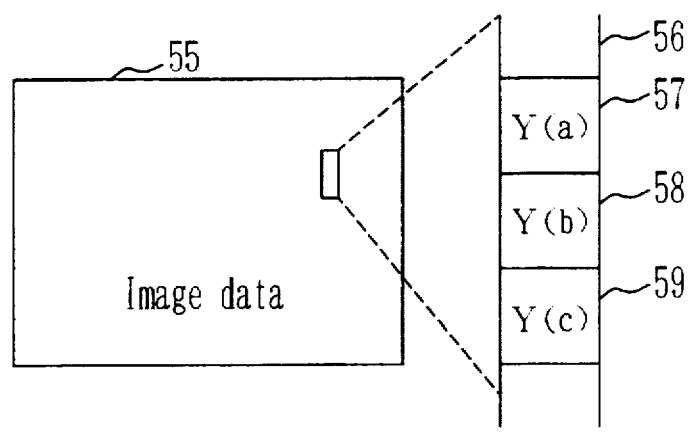
FIG. 2 is an illustration showing a relationship between an attentional picture element and adjacent picture elements.

FIG. 2 is an illustration showing a positional relationship between the attentional picture element and adjacent picture elements. A picture element array 56, which consists of plural picture elements continuously aligned in the vertical direction, is a part of image data 55 stored in a frame memory etc. (not shown). Configuration of the picture element array 56 is magnified in the right side of FIG. 2. A level of the attentional picture element 58 is Y(b), and a level of a picture element 57 upwardly adjacent to the attentional picture element 58 is Y(a). Further, a level of a picture element 59 downwardly adjacent to the attentional picture element 58 is Y(c). In the following description of this embodiment, it is defined for convenience that the picture element 57 upwardly adjacent to the attentional picture element 58 is the "adjacent" picture element. However, it can be defined as another embodiment that the picture element 59 downwardly adjacent to the attentional picture element 58 is the adjacent picture element.

First, in the smoothing step n1, the smoothing process is executed by utilizing the level Y(b) of the attentional picture element 58 and the level Y(a) of the adjacent picture element 57, thereby creating the first substitution level S1. In this embodiment, the first substitution level S1 is a mean value of the levels Y(a) and Y(b). That is:

$$S1=\{Y(a)+Y(b)\}/2.$$

A method for the smoothing process is not limited to the method for obtaining the mean value. There are many known methods such as a method in which a weight of the attentional picture element is enhanced.

Next, in the step n2, the internal division ratio is determined from correlation (i.e., level difference in this embodiment) of the level Y(b) of the attentional picture element 58 and the level Y(a) of the adjacent picture element 57.

Figure 3:
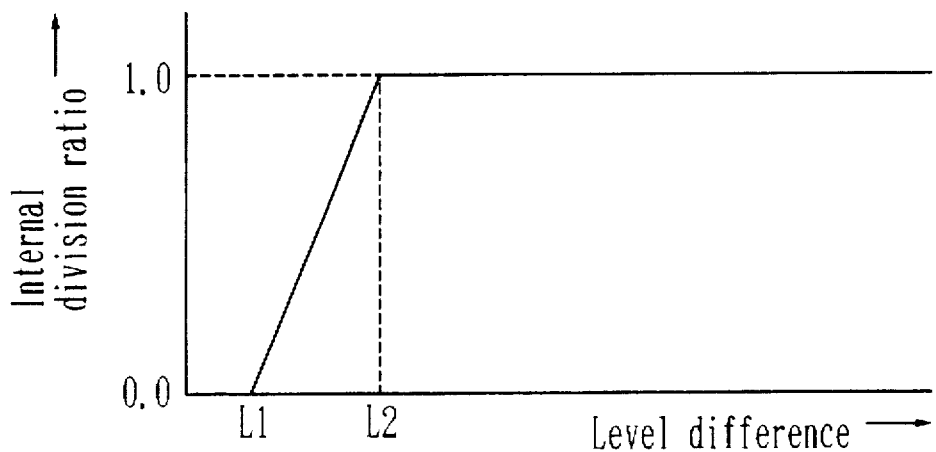
FIG. 3 is a graph showing a function for determining an internal division ratio.

In this embodiment, the internal division ratio K(0.0≦K≦1.0) is determined in compliance with a function shown in FIG. 3 which is for determining the internal division ratio. In FIG. 3, the abscissa is graduated by absolute value of level difference between the level of the attentional picture element 58 and the level of the adjacent picture element 57, and the ordinate is graduated by the internal division ratio K.

According to the function for determining the internal division ratio in the first embodiment, when the level difference is equal to or lower than L1, the internal division ratio K is of the value "0.0". When the level difference is equal to or larger than L2, the internal division ratio K is of the value "1.0". When the level difference falls within a range between L1 and L2, the internal division ratio K has a corresponding value within a range over "0.0" and under "1.0" (i.e., 0.0<K<1.0).

The internal division ratio K is thus determined from the level difference between the level Y(b) of the attentional picture element 58 and the level Y(a) of the adjacent picture element 57. Thereafter, in the step n3 (FIG. 1), the level Y(b) of the attentional picture element 58 and the first substitution level S1 obtained in the above-mentioned smoothing process are internally divided with the internal division ratio K, thereby creating the second substitution level S2.

Figure 4:
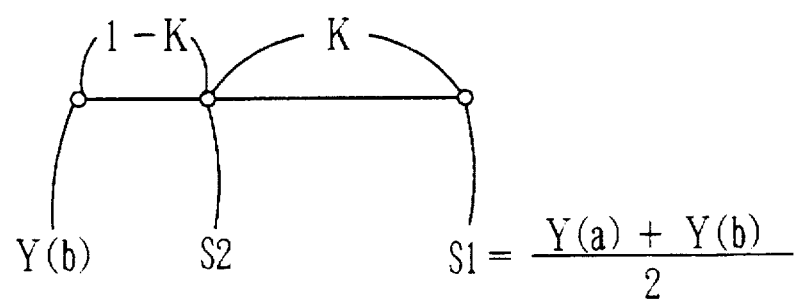
FIG. 4 is an illustration showing a concept of internal division.

FIG. 4 is an illustration showing a concept of the internal division executed in the step n3. The second substitution level S2 is a value which is obtained by internally dividing the level Y(b) of the attentional picture element 58 and the first substitution level S1 with the internal division ratio K.

As is apparent from FIG. 4, when the internal division ratio K is "0.0", the first substitution level S1 is equal to the second substitution level S2. When the internal division ratio K is "1.0", the level Y(b) of the attentional picture element 58 is the second substitution level S2. In other words, the level of the attentional picture element 58 gets no change. When the internal division ratio K has a value of 0.0<K<1.0, a value which is obtained by internally dividing the first substitution level S1 and the level Y(b) of the attentional picture element 58 with the corresponding internal division ratio is the second substitution level S2. Next, in the step n4, the level Y(b) of the attentional picture element 58 is replaced by the second substitution level S2, thereby completing all the steps.

Now, it is assumed that the level differences L1 and L2 of the internal division ratio function have values 10 and 30, respectively, and the upwardly adjacent picture element is the "adjacent" picture element. When the above-mentioned image signal processing method is applied to the image shown in FIG. 22, the resultant image will be shown in FIG. 24. The vertical thin line consisting of 121, 125, 123, 120, and 122 shown in FIG. 22 still remains in the image of FIG. 24 in the form of a vertical thin line consisting of values of 123, 124, 122 and 121. Also, the horizontal thin line consisting of 120, 122, 123, 120 and 119 shown in FIG. 22 still remains in the image of FIG. 24 in the form of a horizontal thin line consisting of values of 120, 122, 124, 120 and 119.

When the above-mentioned image signal processing method is applied to the image shown in FIG. 26, the resultant image will be shown in FIG. 28. As is apparent from FIG. 28, edges are not sharpened, and any pseudo contour (i.e., unnatural growth of level differences between picture elements adjacent to each other) does not occur.

Thus, according to the image signal processing method of this embodiment, there is no concept such that usage of the smoothing process (noise reduction process) is determined on the basis of a mere predetermined threshold value. That is, the first substitution level S1 is modified with the internal division ratio K obtained from correlation between picture elements, thereby maintaining continuity of image. Therefore, the pseudo contour hardly generates, and the noises are reduced without blurring or losing edges of image and thin lines.

SECOND EMBODIMENT OF METHOD

Figure 5:
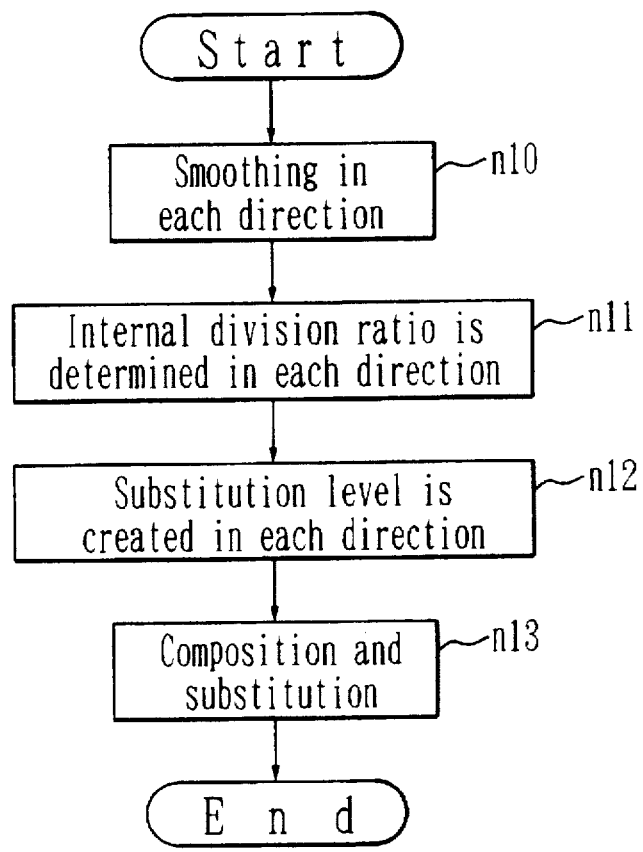
FIG. 5 is a flow chart showing a second method for reducing noise in image signals in the present invention.

FIG. 5 is a flow chart showing a method for reducing noise in image signals in a second embodiment.

In a step n10, a first substitution level S1 is obtained through a smoothing process for picture elements adjacent to each other in each of directions. The first substitution level S1 has been obtained in the first embodiment by referring to the attentional picture element and only one adjacent picture element to the attentional picture element in upper or lower direction, whereas in this second embodiment a plurality of the first substitution levels S1 are obtained for respective adjacent two picture elements in plural directions (e.g., upward, downward, leftward and rightward directions).

Next, in a step n11, internal division ratios K for picture elements adjacent to each other in respective directions are determined. The internal division ratios K are obtained by the similar procedure to that in the first embodiment with respect to each of adjacent directions.

Next, in a step n12, the second substitution levels S2 for respective adjacent two picture elements in respective directions are created by utilizing the internal division ratios K for respective adjacent directions. The second substitution levels S2 are created by the image signal processing method same as that in the first embodiment.

Next, in a step n13, the second substitution levels S2 of respective adjacent directions, which have been obtained in the step n12, are composed with each other, and a level of the attentional picture element is replaced by a resultant composite substitution level.

In composing the substitution levels, it is possible to vary noise-reduction-characteristic by providing the substitution levels with weights for respective adjacent directions. For example, when a weight effective in the vertical direction is enhanced, the light-and-shade noise between fields is easily eliminated.

As has been mentioned above, in this second embodiment noises are reduced by referring to adjacent picture elements noises in multi-direction. Therefore, well-balanced noise reduction process is carried out as compared with the image signal processing method of the first embodiment.

For example, when the image signal processing method of the first embodiment is applied to the attentional picture element and the upwardly adjacent picture element, influence given by the upwardly adjacent picture element acts toward the direction of the attentional picture element (i.e., downward in the vertical direction). As a result, there is a tendency that the level shifts (or disperse) downward as a whole. In contrast, it is possible in the second embodiment to restrict the shift of level even when the image signal processing method is employed with respect to only upward and downward directions, thereby offering well-balanced noise reduction process.

FIRST EMBODIMENT OF APPARATUS

Figure 6:
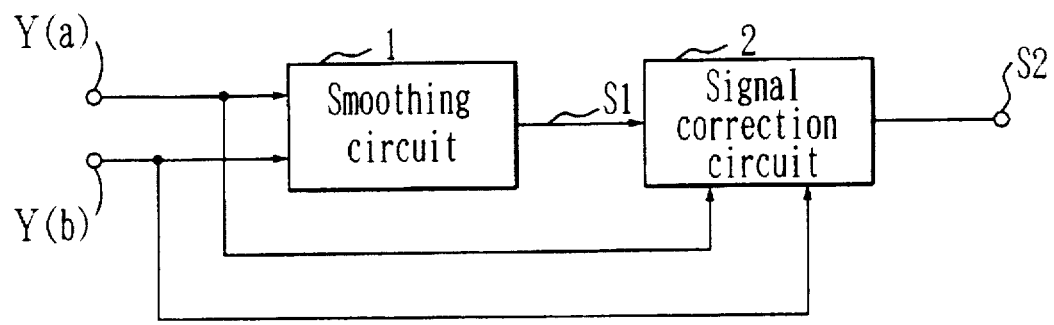
FIG. 6 is a block diagram showing a first apparatus of the present invention incorporating the first method.

FIG. 6 is a block diagram showing an apparatus for reducing noise in the image signals in a first embodiment of apparatus. This apparatus is realized by incorporating the first method.

In FIG. 6, the smoothing process is carried out in a smoothing circuit 1 by referring to a level Y(b) of the attentional picture element and a level Y(a) of a picture element which is upwardly adjacent to the attentional picture element, thereby creating the first substitution level S1. Incidentally, the first substitution level S1 may be a mean level. The first substitution level S1 issued from the smoothing circuit 1 is corrected in a signal correction circuit 2 by referring to a level difference between the level Y(b) of the attentional picture element and the level Y(a) of the adjacent picture element, thereby creating the second substitution level S2. This second substitution level S2 is a noise-reduced signal which should be used for replacing the attentional picture element. In the signal correction circuit 2, finally, the second substitution level S2 is made by executing the internal division with an internal division ratio derived from the level difference between the level Y(b) of the attentional picture element and the level Y(a) of the adjacent picture element.

Next, correction of the first substitution level S1, which is carried out by the signal correction circuit 2, will be described. Now, the internal division ratio derived from the levels Y(a) and Y(b) is defined as "K" in the similar way to the aforementioned first embodiment of method, and the first substitution level S1 is defined as the mean level. Then, the noise-reduced second substitution level S2, which is a level Y(b) for replacing therewith the level of the attentional picture element, is obtained by the following equation (1):

$$Y(b)=(1-K)\times\{Y(a)+Y(b)\}/2+K\times Y(b) \qquad (1)$$

In this equation, the internal division ratio K has value ranging from "0.0" to "1.0".

Transformation of the equation (1) brings the following equation (2):

$$Y(b)=\{Y(a)+Y(b)\}/2+K\times\{Y(b)-Y(a)\}/2 \qquad (2)$$

In this equation (2), the first term represents the first substitution level S1. That is, the first substitution level S1 is corrected by the second term, thereby creating the second substitution level S2. The internal division ratio K is derived, as aforementioned, from the level difference between the level Y(b) of the attentional picture element and the level Y(a) of the adjacent picture element by means of a function for determining the internal division ratio.

Figure 7:
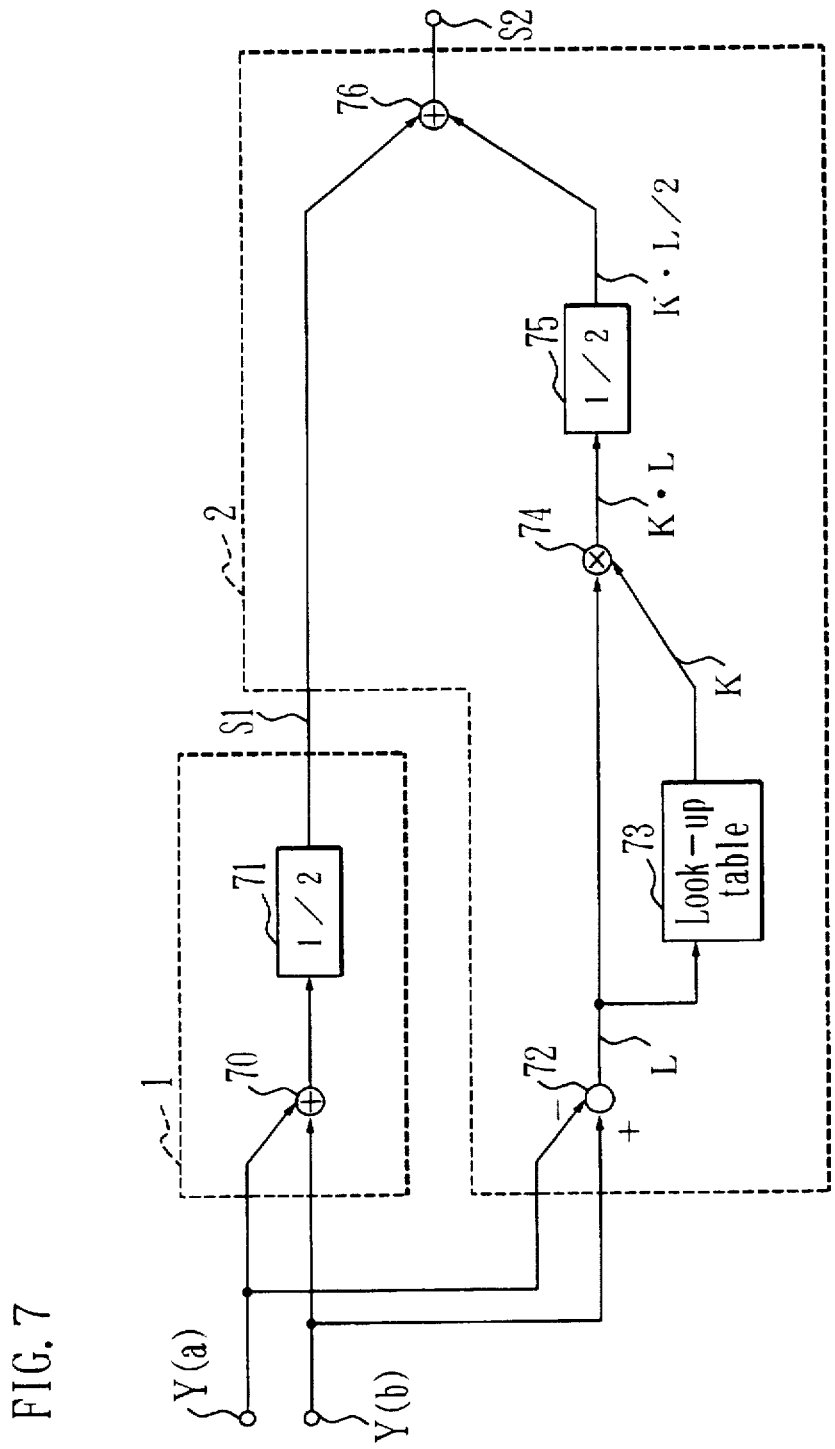
FIG. 7 is a block diagram showing a detailed configuration of a smoothing circuit 1 and a signal correction circuit 2 shown in FIG. 6.

FIG. 7 is a block diagram showing a detailed configuration of the smoothing circuit 1 and the signal correction circuit 2 shown in FIG. 6. In FIG. 7, the smoothing circuit 1 includes an adder 70 and a divider 71. Both the level Y(b) of the attentional picture element and the level Y(a) of the adjacent picture element are added to each other in the adder 70, and a resultant value is divided in the divider 71 into a half value thereof. A signal issued from the divider 71 is the first substitution level S1 (i.e., the mean level).

The signal correction circuit 2 includes a subtracter 72, a look-up table 73, a multiplier 74, a divider 75 and an adder 76. In the subtracter 72, the level Y(a) of the adjacent picture element is subtracted from the level Y(b) of the attentional picture element, thereby issuing a level difference L. In this embodiment, the level difference L has a sign of positive or negative. The level difference L is input to the look-up table 73. In the look-up table 73, the internal division ratio K is issued in response to the level difference L. Contents of the look-up table 73 are prepared by referring to the function for obtaining the internal division ratio as shown in FIG. 3. Since the function shown in FIG. 3 is an absolute function, it is preferable to realize a function symmetrical with respect to the ordinate in the look-up table 73.

In the multiplier 74, the level difference L and the internal division ratio K are multiplied with each other. A resultant value K·L is divided in the divider 75 into its half value, thereby serving as the correction signal K·L/2. This correction signal K·L/2 has a sign of positive or negative and corresponds to the second term of the equation (2). Further, the first substitution level S1 and the correction signal K·L/2 are added to each other in an adder 76, thereby creating the second substitution level S2.

Apart from the configuration shown in FIG. 7 wherein the dividers 71 and 75 are provided in front of the adder 76, the dividers 71 and 75 may be provided after the adding process of the adder 76. Division executed by each of the dividers 71 and 75 is realized by shifting one-bit in an actual circuitry. Therefore, such division is realized only by making connection of signal lines with one-bit shift therebetween.

Figure 8:
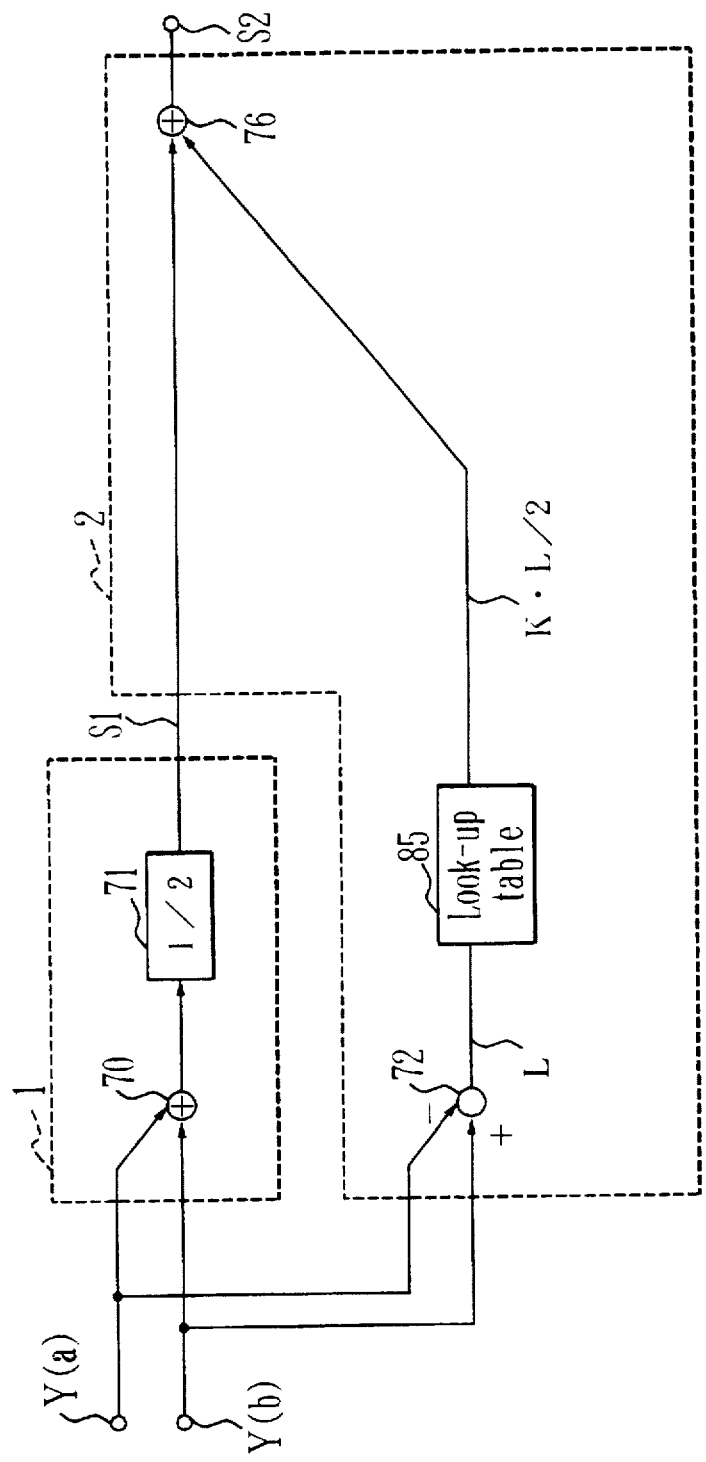
FIG. 8 is a block diagram showing another embodiment of the smoothing circuit 1 and the signal correction circuit 2 shown in FIG. 6.

FIG. 8 is a block diagram showing another embodiment of the smoothing circuit 1 and the signal correction circuit 2 shown in FIG. 6. This embodiment is different from the embodiment shown in FIG. 7 in a configuration of the signal correction circuit 2. In FIG. 8, the signal correction circuit 2 includes a subtracter 72, a look-up table 85 and an adder 76. That is, the look-up table 73, the multiplier 74 and the divider 75 each shown in FIG. 7 are replaced by one look-up table 85. This is based on a fact that the look-up table 73 (FIG. 7), the multiplier 74 (FIG. 7) and the divider 75 (FIG. 7) can be represented by a predetermined function of the level difference L. This function is obtained by multiplying the level difference L and the function of the internal division ratio together and thereafter taking a half value. A concrete example of the function is shown in FIG. 9.

Figure 9:
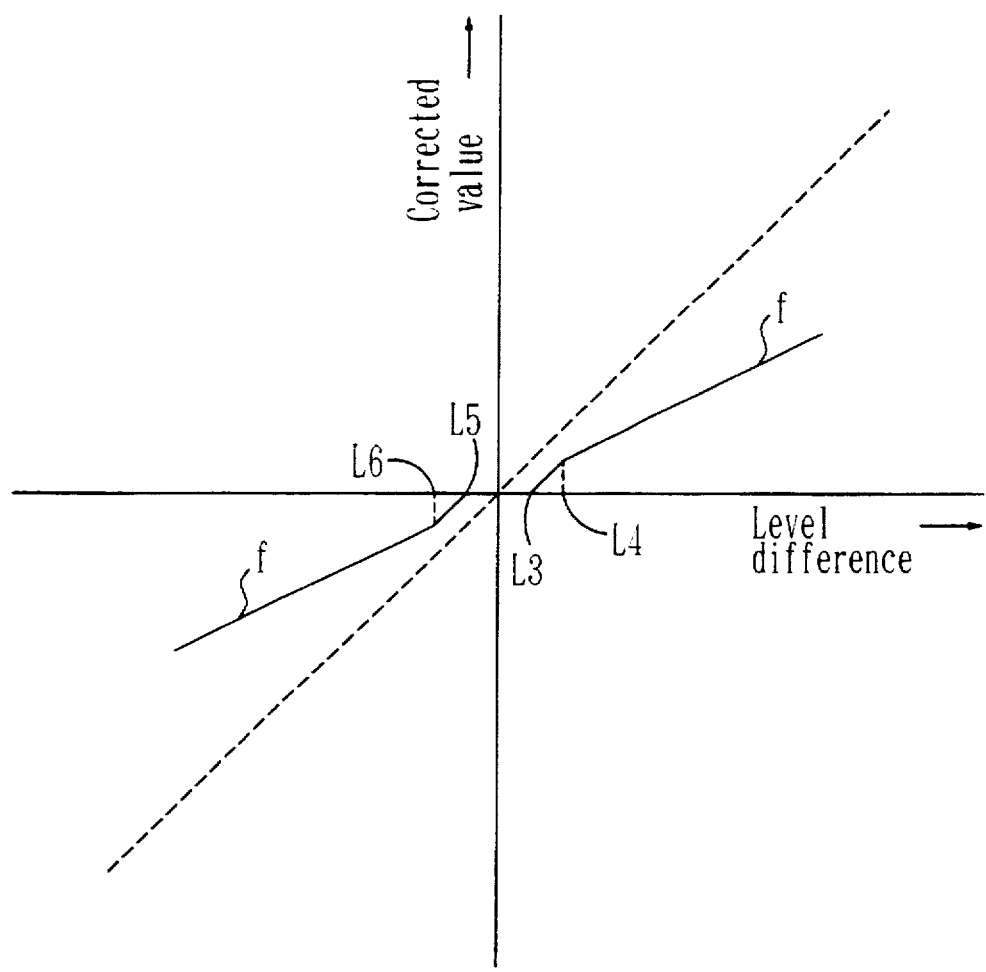
FIG. 9 is a graph showing a function f between a level difference and a corrected value.

FIG. 9 is a graph showing the above-mentioned function f. In FIG. 9, the abscissa is graduated by level difference, and the ordinate is graduated by corrected value (corrected signal). When the level difference is within a range from a threshold value L5 up to a threshold value L3, the corrected value is "0". This means that the first substitution level S1 acts as just the second substitution level S2. When the level difference is equal to or larger than a threshold value L4 or equal to or smaller than a threshold value L6, the corrected value is equal to a half of the level difference, and the second substitution level S2 is equal to the level of the attentional picture element. When the level difference is ranging from a threshold value L6 to a threshold value L5 or ranging from a threshold value L3 to a threshold value L4, the second substitution level S2 takes an intermediate level between the level of the attentional picture element and the first substitution level.

Figure 10:
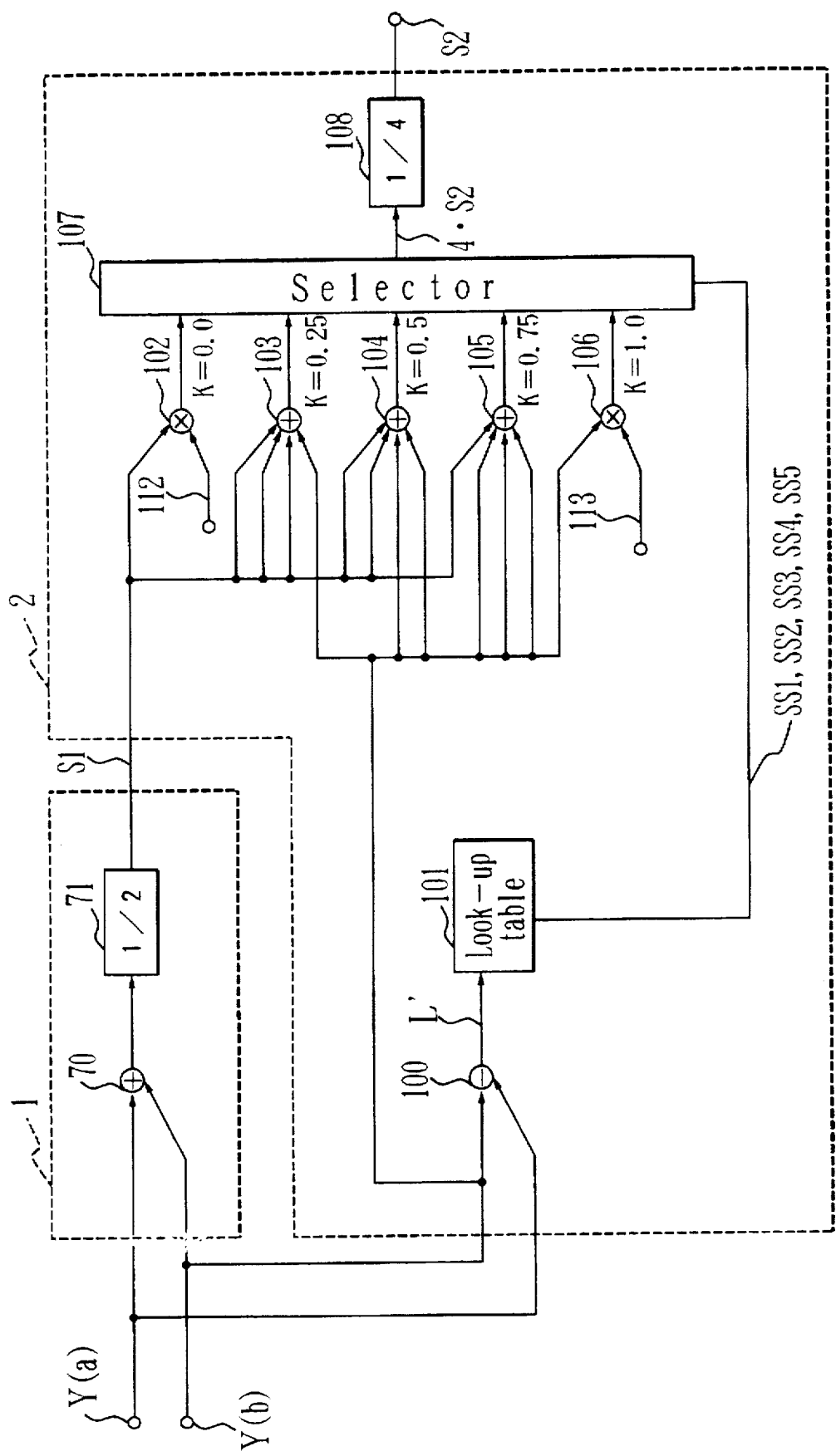
FIG. 10 is a block diagram showing still other embodiment of the smoothing circuit 1 and the signal correction circuit 2 shown in FIG. 6.

FIG. 10 is a block diagram showing still other embodiment of the smoothing circuit 1 and the signal correction circuit 2 shown in FIG. 6. Configuration of the smoothing circuit 1 in this embodiment is the same as that in the embodiment shown in FIG. 7.

In FIG. 10, the second substitution level S2 is created in the signal correction circuit 2 in compliance with the level Y(b) of the attentional picture element, the first substitution level S1 issued from the smoothing circuit 1 and an internal division ratio. This internal division ratio is selected from among five internal division ratios in response to the level difference between the level Y(b) of the attentional picture element and the level Y(a) of the adjacent picture element. The signal correction circuit 2 includes: an operator 100 for obtaining an absolute value of the level difference between the level Y(b) of the attentional picture element and the level Y(a) of the adjacent picture element; a look-up table 101; multipliers 102, 106; multi-input type adders 103–105; a selector 107; and a divider 108.

In the operator 101, an absolute value L' of the level difference between the level Y(b) of the attentional picture element and the level Y(a) of the adjacent picture element is obtained. The level Y(b) of the attentional picture element is input to the multi-input adders 103–105 and the multiplier 106. Values of four times as large as the second substitution level are temporarily generated in compliance with respective five kinds of internal division ratios through the multipliers 102, 106 and the multi-input adders 103–105.

That is, a value "4" is input to a signal line 112, and the first substitution level S1 is multiplied by four in the multiplier 102. This means to get the internal division ratio K having a value "0.0" because the subtracter 108 will make one fourth (¼) operation in a subsequent stage. In the multi-input adder 103, addition of the first substitution level S1 and the level Y(b) of the attentional picture element is carried out with a ratio of 3:1. This means that the internal division ratio K has a value "00.25". In the multi-input adder 104, addition of the first substitution level S1 and the level Y(b) of the attentional picture element is carried out with a ratio of 2:2. This means that the internal division ratio K has a value "0.5". In the multi-input adder 105, addition of the first substitution level S1 and the level Y(b) of the attentional picture element is carried out with a ratio of 1:3. This means that the internal division ratio K has a value "0.75". A value "4" is input to the signal line 113, and the level Y(b) of the attentional picture element is multiplied by four in the multiplier 106. This means that the internal division ratio K has a value "1.0". Output signals of the multipliers 102, 106 and the multi-input adders 103–105 are input to the selector 107. The absolute value L' of the level difference, which is issued from the operator 100, is input to the look-up table 101. In the look-up table 101, selection signals SS1–SS5 respectively corresponding to five internal division ratios K(=0.0, 0.25, 0.5, 0.75, 1.0) are issued in compliance with the absolute value L' of the level difference.

Figure 11:
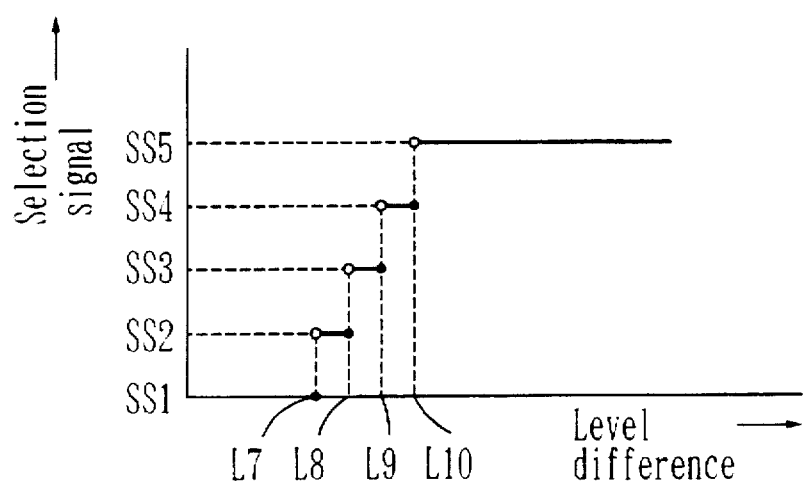
FIG. 11 is a graph showing a function to be stored in the look-up table 101 shown in FIG. 10.

FIG. 11 is a graph showing a function to be stored in the look-up table 101. In FIG. 11, the abscissa is graduated by the level difference, and the ordinate is graduated by the selection signal SS to be issued. When the absolute value L' of the level difference is equal to or smaller than a threshold value L7, the look-up table 101 issues the selection signal SS1 for selecting the value "0.0" as the internal division ratio. When the absolute value L' of the level difference is larger than the threshold value L7 and equal to or smaller than the threshold value L8, the look-up table 101 issues the selection signal SS2 for selecting the value "0.25" as the internal division ratio K. When the absolute value L' of the level difference is larger than the threshold value L8 and equal to or smaller than the threshold value L9, the look-up table 101 issues the selection signal SS3 for selecting the value "0.5" as the internal division ratio K. When the absolute value L' of the level difference is larger than the threshold value L9 and equal to or smaller than the threshold value L10, the look-up table 101 issues the selection signal SS4 for selecting the value "0.75" as the internal division ratio K. When the absolute value L' of the level difference is larger than the threshold value L10, the look-up table 101 issues the selection signal SS5 for selecting the value "1.0" as the internal division ratio K.

In compliance with the selection signals SS1–SS5 issued from the look-up table 101, the selector 107 issues a signal 4·S2 which is obtained by multiplying the second substitution level S2 by four. The divider 108 takes one fourth value of the signal 4·S2 to normalize it. An output signal issued from the divider 108 is just the second substitution level S2.

Incidentally, although the level is multiplied by four through the multipliers 102 and 106, such multiplication can actually be realized by shifting connection of the signal lines by 2-bit. The divider 108 can be realized too by the bit shift.

In this embodiment, the second substitution level S2 is made by five internal division ratios. However, needless to say, the number of internal division ratios is not limited to five.

SECOND EMBODIMENT OF APPARATUS

Figure 12:
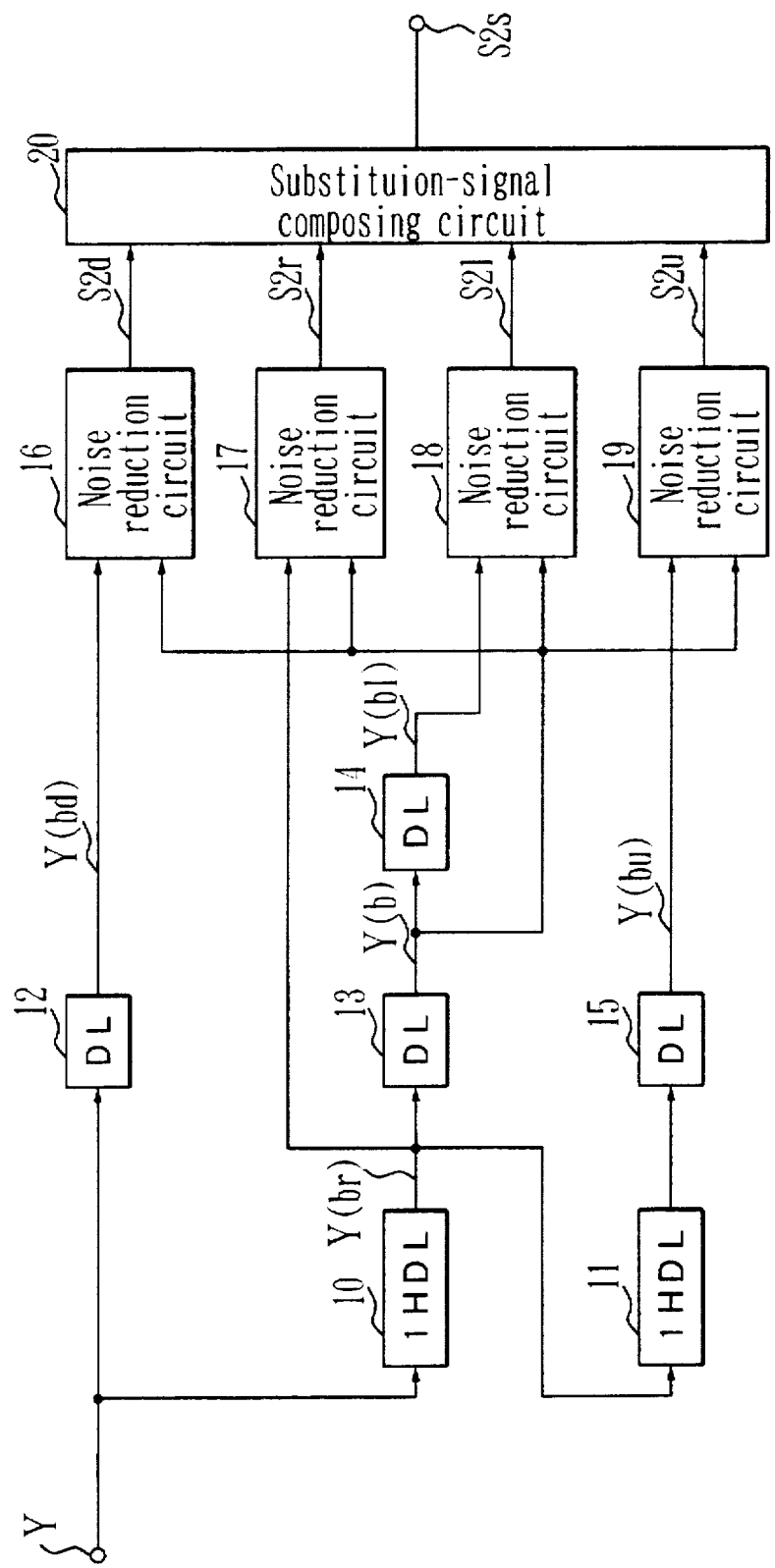
FIG. 12 is a block diagram showing an apparatus of the present invention incorporating the second method.

FIG. 12 is a block diagram showing the method for reducing noise in the image signal according to a second embodiment of apparatus. The apparatus is realized by incorporating the method described as the second embodiment of method. In FIG. 12, the apparatus includes: vertical delay circuits 10 and 11 each for generating a delay of scanning period for one scanning line; delay circuits 12–15 each for generating a delay for one picture element; noise reduction circuits 16–19; and a substitution-signal composing circuit 20. In this embodiment, noise is reduced by utilizing the attentional picture element and picture elements adjacent to the attentional picture element in upward, downward, leftward and rightward directions.

An image input signal Y is supplied to the vertical delay circuits 10, 11 and the delay circuit 12–15, thereby being separated into the level Y(b) of the attentional picture element, a level Y(bu) of the adjacent picture element in the upward direction, a level Y(br) of the adjacent picture element in the rightward direction, a level Y(bl) of the adjacent picture element in the leftward direction, and a level Y(bd) of the adjacent picture element in the downward direction. These four level data can be processed in the subsequent circuits simultaneously with each other.

Each of the noise reduction circuits 16–19 has the similar configuration to that shown in FIG. 6. In the noise reduction circuit 16, a second substitution level S2d is created with respect to a direction of the attentional picture element and the downward-adjacent picture element by utilizing the level Y(b) of the attentional picture element and the level Y(bd) of the downward-adjacent picture element. In the noise reduction circuit 17, a second substitution level S2r is created with respect to a direction of the attentional picture element and the rightward-adjacent picture element by utilizing the level Y(b) of the attentional picture element and the level Y(br) of the rightward-adjacent picture element. In the noise reduction circuit 18, a second substitution level S2l is created with respect to a direction of the attentional picture element and the leftward-adjacent picture element by utilizing the level Y(b) of the attentional picture element and the level Y(bl) of the leftward-adjacent picture element. In the noise reduction circuit 19, the second substitution level S2u is generated with respect to a direction of the attentional picture element and the upward-adjacent picture element by utilizing the level Y(b) of the attentional picture element and the level Y(bu) of the upward-adjacent picture element.

In the substitution-signal composing circuit 20, the second substitution levels S2u, S2d, S2r and S2l are composed with each other to generate a composite substitution level S2s, and the level Y(b) of the attentional picture element is replaced by the composite substitution level S2s. Thus, well-balanced noise reduction is executed. Configuration of the noise reduction circuits 16–19 is the same as shown in FIG. 6 and can be selected from among the concrete circuitry shown in FIG. 7, FIG. 8 and FIG. 10.

Figure 13:
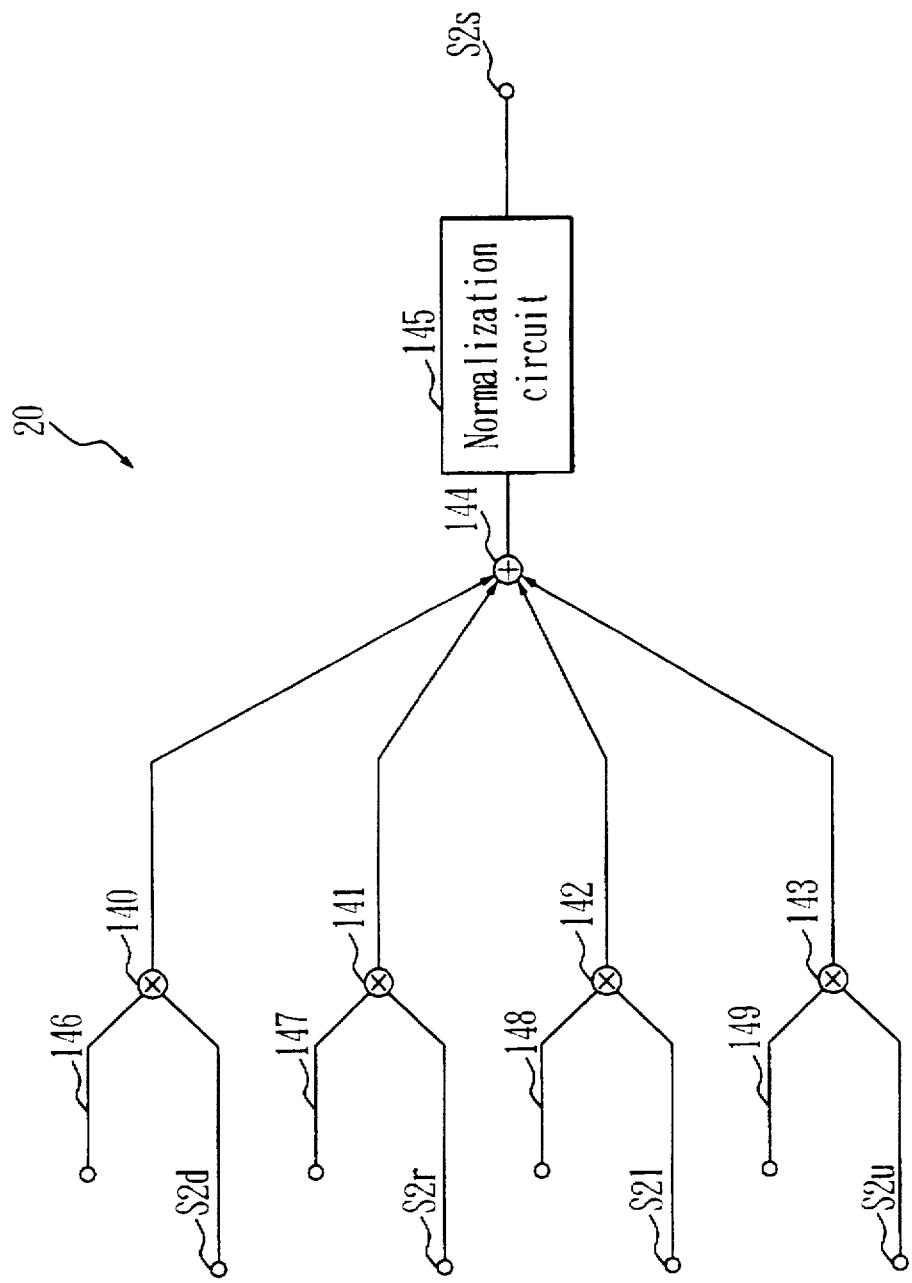
FIG. 13 is a block diagram showing the substitution-signal composing circuit 20 shown in FIG. 12.

FIG. 13 is a block diagram showing the substitution-signal composing circuit 20 which includes multipliers 140–143, a multi-input adder 144 and a normalization circuit 145. In the multipliers 140–143, the second substitution levels in respective adjacent directions are multiplied by weight coefficients 146–149, respectively, thereby giving corresponding weights effective in respective directions. The multi-input adder 144 adds all the weighted second substitution levels together. The normalization circuit 145 normalizes (divides) a composite signal issued from the multi-input adder 144, thereby creating the composite substitution level S2s. For example, the above-mentioned weight coefficients 146 and 149 (i.e., upward and downward) take a value "2", and the weight coefficients 147 and 148 (i.e., rightward and leftward) take a value "1". Further, in the normalization circuit 145, the composite signal issued from the adder 144 is divided by "6".

Incidentally, the multipliers 140–143 are unnecessary when no weighting process is needed. Also, a mere bit-shift configuration may serve as the multipliers 140–143. Further, the normalization circuit 145 may be realized by executing a division operation with a sum of weight coefficients or by making bit-shift in relation to the sum of weight coefficients.

Besides, although picture elements of four directions (upward, downward, leftward, rightward) are utilized as adjacent picture elements, the directions are not limited to these four. For example, the directions may be only two such as upward and downward.

In the above-mentioned respective embodiments, description has been made on monochrome data. In case color data is handled, it is not proper to apply the above-mentioned image signal processing method to R, G and B data independently from each other. It is preferable to use luminance signal or G data as a typical level.

The delay circuit can be constituted by a synchronous circuit in which a latch circuit or a flip-flop is used, together with a clock for realizing synchronization.

The above-mentioned vertical delay circuit can be constituted by a line memory or a buffer etc.

Although the above-mentioned embodiments are realized by hardware only, it is possible to offer another embodiment having a CPU (Central Processing Unit) system. Such system is constituted by combining: a CPU (or digital signal processor) for executing commands; a ROM for storing data tables and commands to be given to the CPU; a RAM for securing a working area which allows the CPU to execute the commands and for serving as a line buffer which stores data for two scanning lines to execute the processes of the present invention; an I/O port for inputting/outputting image signals; and a predetermined software routine.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for reducing noise in image signals, comprising the steps of:
    smoothing in plural directions a level of an attentional picture element in an image and each of levels of adjacent picture elements located adjacent to said attentional picture element in said plural directions to create first substitution levels respectively in said plural directions;
    determining internal division ratios respectively in said plural directions by referring to said level of the attentional picture element and each of said levels of the adjacent picture elements, said internal division ratio being limited to 1 when a level of difference between an attentional picture element and an adjacent picture element is larger than a predetermined level difference;
    creating second substitution levels respectively in said plural directions by internally dividing between said level of the attentional picture element and each of said first substitution levels;
    composing said second substitution levels together to obtain a composite substitution level; and
    replacing said level of the attentional picture element by said composite substitution level.

2. A method in accordance with claim 1, wherein said composite substitution level is obtained by composing said second substitution levels with respective weights given thereto.

3. A method in accordance with claim 1, wherein said step of smoothing is to obtain a mean value of said level of the attentional picture element and said level of the adjacent picture element.

4. A method in accordance with claim 2, wherein said step of smoothing is to obtain a mean value of said level of the attentional picture element and said level of the adjacent picture element.

5. An apparatus for reducing noise in image signals, comprising:
    smoothing means for smoothing in plural directions a level of an attentional picture element in an image and levels of adjacent picture elements located adjacent to said attentional picture element in said plural directions to create first substitution levels respectively in said plural directions;
    signal correction means for respectively correcting said first substitution levels into second substitution levels with respect to said plural directions, each of said second substitution levels corresponding to a level for internally dividing between said level of the attentional picture element and each of said first substitution levels on the basis of an internal division ratio derived from correlation between said level of the attentional picture element and each of said levels of the adjacent picture elements, said internal division ratio being limited to 1 when a level of difference between an attentional picture element and an adjacent picture element is larger than a predetermined level difference; and
    substitution-signal composing means for composing said second substitution levels together to obtain a composite substitution level for replacing therewith said level of the attentional picture element.

6. An apparatus in accordance with claim 5, wherein said composite substitution level is obtained by composing said second substitution levels with respective weights given thereto.

7. An apparatus in accordance with claim 5, wherein said smoothing means is to obtain a mean value of said level of the attentional picture element and said level of the adjacent picture element.

8. An apparatus in accordance with claim 5, wherein said signal correction means creates a correction signal by converting a level difference between said level of the attentional picture element and said level of the adjacent picture element through a predetermined function and adds said correction signal to said first substitution level to thereby obtain said second substitution level, and said function is a continuous function by which said second substitution level comes close to said first substitution level in response to decrease of said level difference and comes close to said level of the attentional picture element in response to increase of said level difference.

9. An apparatus in accordance with claim 5, wherein said signal correction means obtains said second substitution level by internally dividing said level of the attentional picture element and said first substitution level with said internal division ratio derived by converting a level difference between said level of the attentional picture element and said level of the adjacent picture element through a predetermined function which has a characteristic such that said second substitution level comes close to said first substitution level in response to decrease of said level difference and comes close to said level of the attentional picture element in response to increase of said level difference.

* * * * *